(12) United States Patent
Kerns, Jr. et al.

(10) Patent No.: US 6,305,801 B1
(45) Date of Patent: Oct. 23, 2001

(54) CONTACT LENS WITH FILTERING FOR OUTDOOR SPORTING AND RECREATIONAL ACTIVITIES

(75) Inventors: David V. Kerns, Jr., Waltham, MA (US); J. Paul Moore, Leawood, KS (US)

(73) Assignee: PeakVision, LLC, Nashville, TN (US)

( * ) Notice: Subject to any disclaimer, the term of this patent is extended or adjusted under 35 U.S.C. 154(b) by 0 days.

(21) Appl. No.: 09/453,379

(22) Filed: Dec. 2, 1999

(51) Int. Cl.$^7$ ........................................... G02C 7/04
(52) U.S. Cl. ................................. 351/162; 351/177
(58) Field of Search ........................ 351/160 R, 160 H, 351/161, 162, 163, 177

(56) References Cited

U.S. PATENT DOCUMENTS

| | | | |
|---|---|---|---|
| 3,034,403 | 5/1962 | Neefe | 88/54 |
| 4,252,421 | 2/1981 | Foley, Jr. . | |
| 4,576,453 | * 3/1986 | Borowsky | 351/162 |
| 4,666,640 | * 5/1987 | Neefe | 351/162 |
| 4,669,834 | 6/1987 | Richter . | |
| 4,681,412 | 7/1987 | Lemelson | 351/162 |
| 4,707,236 | 11/1987 | Borowsky | 204/182 |
| 4,840,477 | 6/1989 | Neefe . | |
| 5,059,018 | 10/1991 | Kanoma et al. . | |
| 5,235,358 | 8/1993 | Mutzhas | 351/163 |
| 5,302,978 | 4/1994 | Evans . | |
| 5,414,477 | 5/1995 | Jahnke . | |
| 5,434,630 | 7/1995 | Bransome . | |
| 5,592,245 | 1/1997 | Moore et al. . | |
| 5,617,154 | 4/1997 | Hoffman . | |
| 5,662,707 | 9/1997 | Jinkerson | 623/6 |

OTHER PUBLICATIONS

Bolle's Competivision, *Tennis*, Aug. 1998.

* cited by examiner

*Primary Examiner*—Scott J. Sugarman
(74) *Attorney, Agent, or Firm*—Waddey & Patterson; Mark J. Patterson

(57) ABSTRACT

A contact lens has at least one optical filter region that can be surrounded by a clear optical region. The one or more filter regions have a diameter such that an increasing percentage of visible light is transmitted to the pupil of the eye as lighting conditions change from high-intensity lighting environments to low-intensity lighting environments. The cooperation between the changing pupil and lens provides an automatic adjustment of light intensity perceived by the wearer in response to the changing light conditions. Different filtering characteristics are provided in the filter regions to enhance perception of light corresponding to light reflected by an object or background scene used in outdoor sporting and recreational activities, while attenuating other reflected light.

23 Claims, 6 Drawing Sheets

CONTACT LENS WITH FILTERING FOR OUTDOOR SPORTING AND RECREATIONAL ACTIVITIES

BACKGROUND OF THE INVENTION

The present invention relates generally to wearable optics for outdoor sporting and recreational activities. More particularly, this invention relates to contact lenses for outdoor sporting and recreational activities that vary the amount of light passing through the contact lenses to the retina of the eye, depending on the light intensity and wavelength, so that improved visual perception is possible.

U.S. Pat. No. 5,617,154, issued to Hoffman on Apr. 1, 1997, describes a light-filtering contact lens for outdoor wear. The Hoffman contact lens variably transmits light having wavelengths ranging from 500 to 700 nm and prevents the transmission of ultraviolet and blue light, that is, light having wavelengths ranging from approximately 200 nm to approximately 500 nm. Although the '154 patent teaches that blue light is linked to undesirable effects on the human eye, other studies indicate that blue light is necessary for enhanced perception of many objects in sporting and recreational activities.

U.S. Pat. No. 5,592,245, issued to the inventors of the present invention on Jan. 7, 1997, teaches the use of light-filtering eyeglasses to enhance perception of objects in outdoor sporting or recreational activities. The light-filtering eyeglasses enhance perception by allowing the transmission of light having wavelengths that are substantially corresponding to and adjacent to the wavelengths of light reflected by the object used in the outdoor sporting event, and substantially attenuating other reflected light. The '245 patent suggests the use of conventional contact lenses rather than eyeglasses, but does not disclose contact lenses capable of cooperating with the pupil of the eye to automatically accommodate both high-intensity lighting environments and low-intensity environments.

What is needed, then, is a contact lens having at least one optical filter region that: (1) transmits blue light as well as other wavelengths in order to enhance perception of objects used in outdoor sporting, recreational and other activities; (2) transmits light corresponding to the wavelength of light reflected by an object used in an outdoor sporting or recreational activity and attenuates other reflected light; and (3) automatically varies light perception as lighting conditions change from high-intensity lighting environments to low-intensity lighting environments.

SUMMARY OF THE INVENTION

This invention accomplishes these and other objectives with a contact lens comprising a contact lens body having one or more optical filter regions having characteristics optimized for use in outdoor activities but adaptable for use in low ambient light conditions as well.

In a first embodiment of the invention, a contact lens has a single optical filter region disposed in the center of the lens body, with the optical filter region having a diameter approximately equal to the diameter of a pupil when constricted in response to exposure to high-intensity light. The optical filter region is surrounded by an optical region on the lens body that is substantially clear such that it transmits substantially all of the light in the visible region greater than 400 nm, while preferably providing UV protection by blocking light having wavelengths less than 400 nm. The percentage of light transmitted through the optical filter region can be constant or variable and may vary from greater zero percent (>0%) to less than one hundred percent (<100%), and lenses having different characteristics can be offered to correspond to the subjective desires of different users. In accordance with one object of the invention, the optical filter region has a diameter that is selected to correlate with the size of the pupil in the eyes of the wearer of the lens so that when the pupil dilates under low light conditions, an increasing percentage of the light passes through the clear area of the lens. Conversely, when the ambient light is bright, the pupil will constrict such that a decreasing percentage of the light will pass through the clear area as compared to the optical filter region. This will have the effect of automatically varying the perceived brightness of the object or scene as the eye is exposed to varying levels of ambient light.

The single optical filter region may, optionally, have one of three different filter characteristics:

(1) The optical filter region is operative to provide UV protection by substantially attenuating light having wavelengths approximately less than 400 nm while transmitting a relatively higher percentage of light over at least some visible wavelengths greater than 400 nm. In an optical filter region of this first characteristic type, the percentage of light transmitted may be constant over a range of wavelengths greater than 400 nm or the transmission percentage may vary. In either case, the total light transmitted over all visible wavelengths greater than 400 nm is greater as compared to the total light transmitted at wavelengths less than 400 nm. In addition, the optical filter region does provide attenuation above 400 nm in the nature of conventional sunglasses such that the transmission percentage of visible wavelengths is less than 100%.

(2) The optical filter region is operative to provide U-V protection by substantially attenuating light having wavelengths approximately less than 400 nm, transmitting a relatively higher (but less than 100%) fixed or variable percentage of light having wavelengths ranging from approximately 400 nm to approximately 600 nm, with a transmittance peak centered substantially around 500–525 nm, and to substantially attenuate light having wavelengths greater than 600 nm with the transmittance of the lens rolling off more rapidly on the red side of the curve than on the blue side.

(3) The optical filter region is operative to substantially attenuate light having wavelengths less than approximately 300 nm, to transmit a variable percentage of light having wavelengths ranging from approximately 300 nm to 680 nm with a reduced transmittance in the approximate range of 550–575 nm, and to transmit a fixed or variable greater percentage of visible light having wavelengths greater than 680 nm.

In a second embodiment of the invention, the contact lens body has first, second, and third adjacent optical filter regions arranged concentrically around the center of the lens. The outermost diameter of the three combined optical filter regions is approximately equal to the diameter of a pupil exposed to low-intensity light, that is, a fully dilated pupil. A clear optical region as described above may be provided that surrounds the third optical filter region. The lenses can be manufactured in multiple configurations having varying light transmittance levels such that a particular lens is selected in accordance with the subjective desires of the user, and may vary from greater than zero percent (>0%) to less than one hundred percent (<100%).

Each of the three optical filter regions may have one of the three different filter characteristics that were described with reference to the first embodiment of the lens having a single optical filter region, as discussed above. Further, the first, second, and third optical filter regions may be manufactured to provide different transmission characteristics such that the total light transmitted at visible wavelengths greater than 400 nm increases from the first to the second, and then from the second to the third, optical filter regions. This provides the automatic adjustment of attenuation and brightness as perceived by the wearer as the pupil changes in size.

In a third embodiment of the invention, a contact lens has first, second, and third adjacent optical filter regions arranged concentrically around the center of the lens. The outermost diameter of the three combined optical filter regions is approximately equal to the diameter of a pupil exposed to low-intensity light, that is, a fully dilated pupil. A clear optical region as described above may be provided that surrounds the third optical filter region. The lenses can be manufactured in multiple configurations having varying light transmittance levels such that a particular lens is selected in accordance with the subjective desires of the user, and may vary from greater than zero percent (>0%) to less than one hundred percent (<100%). In this third embodiment, each of the three optical filter regions may again have one of three different filter characteristics as described above. The first optical filter region substantially attenuates light having wavelengths less than approximately 400 nm, while transmitting a relatively higher percentage of the total available light having visible wavelengths greater than 400 nm, where the transmission percentage can be constant or vary within this range. The second optical filter region is operative to provide a filter gradient whereby an increasing percentage of the total visible light having wavelengths greater than 400 nm is transmitted as the filter region extends outwardly. The third optical filter region is operative to transmit substantially all of the visible light having wavelengths greater than 400 nm. The increasing percentage of total light transmitted from the inner most to the outermost filter region provides the automatic adjustment feature of the invention as discussed above.

In a second variation of this third embodiment, the first and second optical filter regions are operative to substantially attenuate light having wavelengths approximately less than 400 nm, to transmit a relatively higher fixed or variable percentage of light having wavelengths ranging from between approximately 400 nm and approximately 600 nm, with a transmittance peak centered substantially around 500–525 nm and with the transmittance of the lens rolling off more rapidly on the red side of the curve than on the blue side, and to substantially attenuate visible light having wavelengths greater than 600 nm. Furthermore, the first (centermost), second and third optical filter regions provide a relative percentage of transmittance of the total available visible light that increases from the first to the second optical filter regions and then again from the second to the third optical filter regions.

In a third variation of this third embodiment, the first and second optical filter regions substantially attenuate light having wavelengths less than 300 nm. Furthermore, the first (innermost) and second optical filter regions each transmit variable percentages of light having wavelengths ranging from between approximately 300 nm and approximately 680 nm with a minimum transmittance in the approximate range of 550–575 nm, and transmit a fixed or variable greater percentage of the total visible light having wavelengths greater than 680 nm, such variable percentages increasing such that the transmittance within this range increases from the first to the second optical filter regions. The third optical filter region transmits substantially all of the light having wavelengths between 300 and approximately 680 nm.

Another object of the present invention is to provide a contact lens having an optical filter region that transmits a percentage of the total light over a range of visible wavelengths that increases from an inner portion to an outer portion of the filter region. The percentage of total visible light passing through the optical filter region increases from a low percentage at a point closest to the center of the contact lens body to a high percentage at a point farthest from the center of the contact lens body. The optical filter region has a diameter approximately equal to the diameter of a pupil exposed to low-intensity light, that is, a fully dilated pupil. The percentage of light allowed to pass through the optical filter region in a particular lens can be varied during manufacturing to accommodate the subjective desires of various users and may vary from greater than zero percent (>0%) to less than one hundred percent (<100%).

In this case, the optical filter region may have one of three different transmission characteristics. In one preferred embodiment, the first optical filter region is provided with a filter gradient to transmit an increasing percentage of the total light having visible wavelengths greater than 400 nm at increasing radial distances from the center of the lens, and to substantially attenuate light having wavelengths less than 400 nm. In a second variation, the optical filter region substantially attenuates light having wavelengths approximately less than 400 nm, transmits a relatively higher fixed or variable percentage of total light having wavelengths ranging between approximately 400 nm and approximately 600 nm, with a transmittance peak centered substantially around 500–525 nm, and substantially attenuates visible light having wavelengths greater than 600 nm, with the transmittance of the lens rolling off more rapidly on the red side of the curve than on the blue side. In a variation of this embodiment, the optical filter region transmits an increasing variable percentage of total light having wavelengths ranging from approximately 300 nm to approximately 680 nm, transmits an increasing percentage of total light having wavelengths approximately greater than 680 nm, and substantially attenuates light having wavelengths less that approximately 300 nm.

In another embodiment of the invention, a contact lens is provided with a filter portion that will include one or more optical filter regions extending outwardly from the center of the lens body. The filter characteristic (which may include the transmittance level) of the filter portion of the lens changes gradually or in steps from the inner portion to an outer portion of the region. For example, the inner portion of the filter region may have a primarily green tint but this changes gradually or in steps to a blue tint as the filter region extends outwardly.

Another object of the present invention is to provide a contact lens having an optical filter region operative to allow the transmission of light reflected from an object or background scene found in outdoor sporting and recreational activities and to attenuate other reflected light, or to enhance the visualization of certain objects in particular backgrounds and lighting conditions.

The above and other objects, features, and advantages of the present invention should become even more readily apparent to those skilled in the art upon a reading of the following detailed description in conjunction with the drawings wherein there is shown and described illustrated embodiments of the invention.

BRIEF DESCRIPTION OF THE DRAWINGS

FIG. 4 shows an overlay of three curves corresponding to three different optical filter regions having different filter characteristics on a contact lens.

DESCRIPTION OF THE PREFERRED EMBODIMENTS

Figure 1:
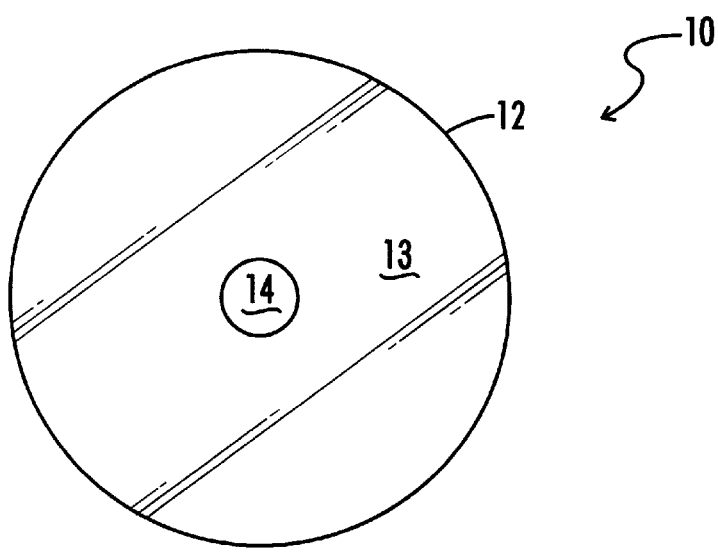
FIG. 1 is a plan view of a first embodiment of the present invention having a contact lens body and a single optical filter region.

Referring to FIG. 1, a first embodiment of a contact lens 10 includes a conventionally shaped contact lens body 12 having a single central optical filter region 14. The contact lens body 12 is of the type commonly found in the art and may be either a hard or soft contact lens body. The optical filter region 14 is created by treating the contact lens body 12 with a dye or interference coating to provide a desired light filtering characteristic. It may have an annular, oval, or other shape to accommodate the particular needs of the wearer or of the application. Preferably, the optical filter region is sized to correspond to or correlate with the size of the pupil of the eye. An annular region having a diameter of 0.8 mm to 8 mm can be used.

Outside of an d surrounding the optical filter region 14 is an optically clear region 13 that transmits substantially all of the available visible light, although may be treated to block UV light (<400 nm). With this geometry, the relative percentage of total visible light passing through the clear region 13 as compared to light passing through the optical filter region 14 will increase as the pupil dilates under low light conditions. Accordingly, the brightness perceived by the wearer will automatically adjust as the level of ambient light varies.

Generally, the optical filter region 14 is intended to provide a reduced light transmittance in the manner of a conventional sunglass lens (typically <50% transmittance) and using a certain filter characteristic to provide improved performance in visual perception. Referring to FIG. 2A, FIG. 2B, FIG. 3, and FIG. 4, variations of three desired filter characteristics of the optical filter region 14 are illustrated. Curves 16, 18, and 20 are graphs that illustrate the percentage of incident light as a function of wavelength transmitted by the optical filter region 14.

Figure 2A:
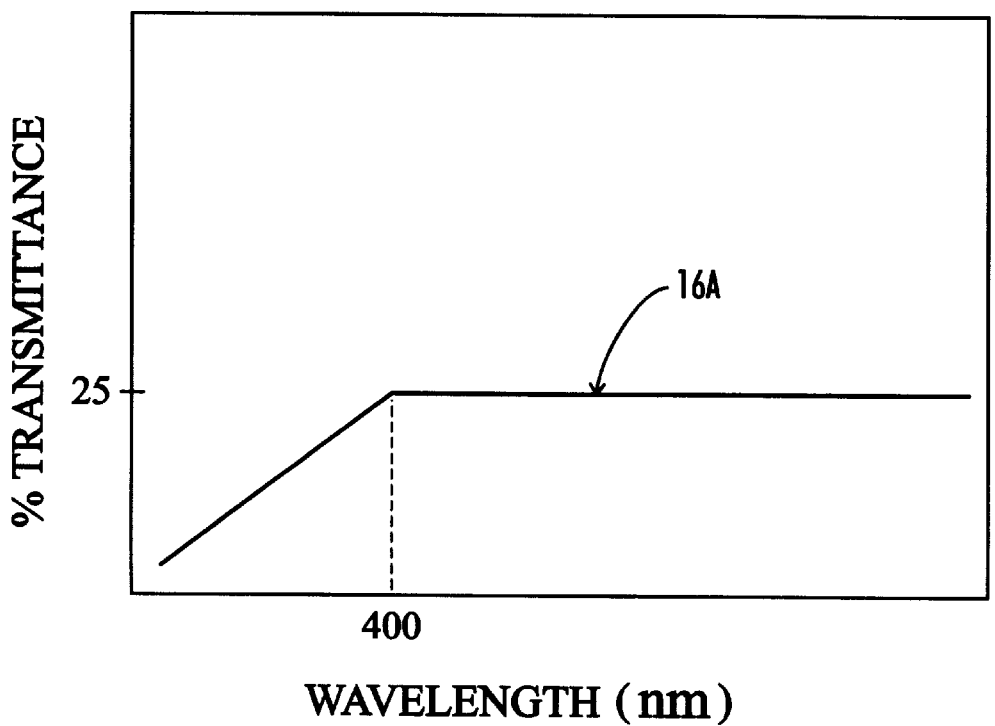
FIG. 2A is a graph showing a substantial attenuation of light below 400 nm for UV protection and a relatively constant transmission of light having wavelengths approximately greater than 400 nm.
Figure 2B:
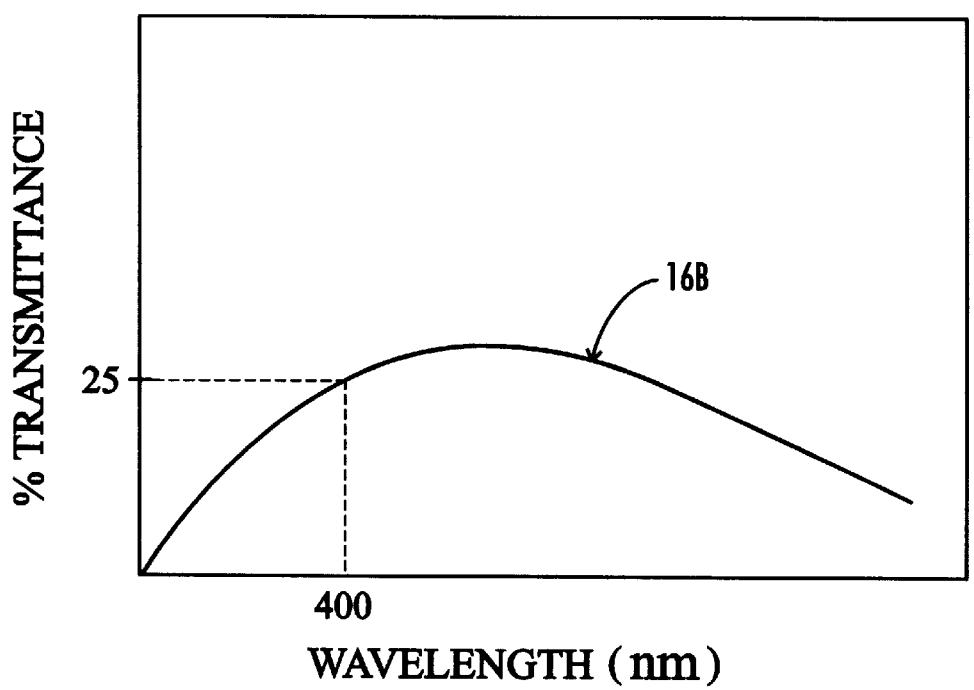
FIG. 2B is a graph showing attenuation of light below 400 nm for UV protection and a varying transmission of light having wavelengths approximately greater than 400 nm and including a substantial transmittance of light in the blue region.

Curve 16A on FIG. 2A has an approximately flat transmission characteristic for visible wavelengths approximately greater than 400 nm, while curve 2B on FIG. 2B shows a variation in light transmittance above 400 nm. FIG. 2A represents an idealized flat transmittance curve while FIG. 2B represents a transmittance curve that is more typical of what can be achieved using conventional optics. An optical filter region 14 having this transmission characteristic transmits approximately twenty-five (25%) of visible light at wavelengths greater than approximately 400 nm and rolls off to approximately zero percent (0%) for light at wavelengths approximately less than 400 nm. This provides protection against exposure to ultraviolet (UV) radiation. In each case, although there may be a variation in transmittance for visible wavelengths above 400 nm, there is a substantial relative transmittance of light in the blue region (for enhanced visual perception in certain outdoor activities), as compared to a prior art lens which deliberately minimizes the transmittance of light in the blue region.

Figure 3:
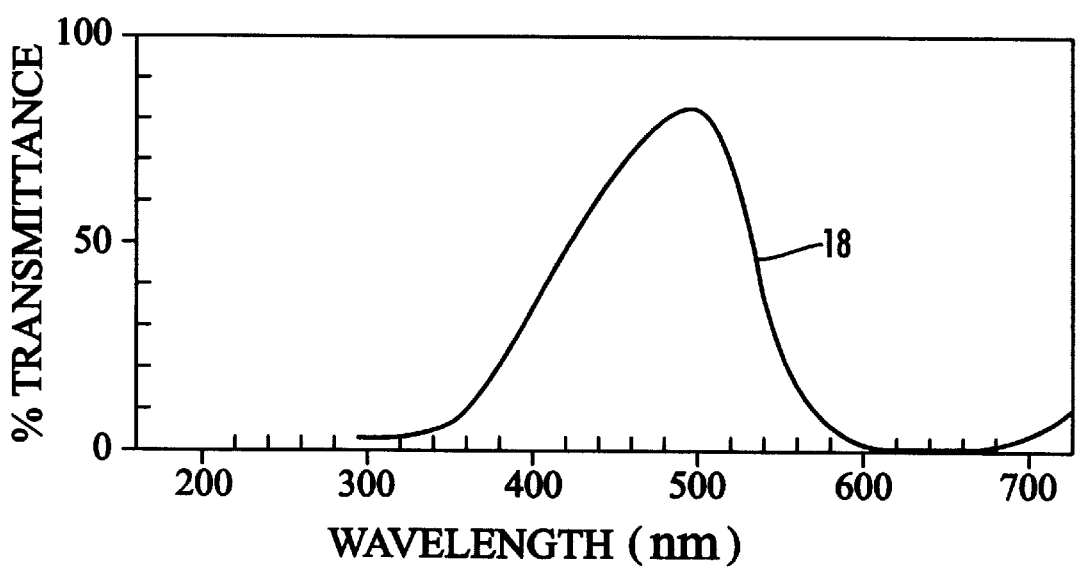
FIG. 3 is a graph showing a variable transmission percentage of light having wavelengths ranging from approximately 300 nm to approximately 600 nm, with a transmittance that rolls off more rapidly on the red side of the curve than on the blue side.

Curve 18 on FIG. 3 shows a filter characteristic having a transmission percentage peak within the range of approximately 300 nm and approximately 600 nm. An optical filter region 14 having this transmission characteristic substantially attenuates light at wavelengths approximately less than 300 nm and approximately greater than 600 nm, transmits a gradually increasing percentage, the percentage ranging from approximately greater than zero percent (>0%) to approximately less than one hundred percent (<100%), of wavelengths ranging from approximately 400 nm to approximately 510 nm, and transmits a gradually decreasing percentage, the percentage ranging from approximately less than 100 percent (<100%) to approximately greater than zero percent (>0%), of wavelengths over the range from approximately 510 nm to approximately 600 nm. There is a transmittance peak at or near a target wavelength of approximately 510–525 nm. Preferably, the transmittance near this target wavelength is high and is optimized to provide a sun glass effect in which the total amount of visible light reaching the eye is somewhat reduced. For example, a peak transmission percentage of approximately 70–80% within this range can be used, but this can vary depending on the total area under the curve. In addition, the transmittance roll-off is greater on the red side of the curve than on the blue side of the curve. This provides an idealized filter characteristic directed at the target spectrum for a yellow-green tennis ball as described in U.S. Pat. No. 5,592,245, the disclosure of which is incorporated herein by reference. The same general filter characteristic (but changing the target wavelength) can be used for the target spectra of other target objects. Also, the optical filter region can be manufactured such that it has a filter characteristic that is tuned to more than one target or has more than one spectral peak.

Curves 20, 21, and 23 (FIG. 4) characterize lavender color filters, having a variable transmission percentage for wavelengths ranging from between approximately 300 nm and 680 nm. An optical filter region 14 having the filter characteristic shown in curve 20 substantially attenuates light at wavelengths approximately less than 300 nm, transmits a high percentage of the total light having wavelengths ranging from approximately 300 nm to approximately 450 nm, and transmits a lower percentage, the percentage decreasing from approximately seventy percent (70%) to approximately eighteen percent (18%) for example, of wavelengths ranging from approximately 450 nm to approximately 560 nm, and then transmits a high percentage of visible light at wavelengths above approximately 700 nm.

Figure 5:
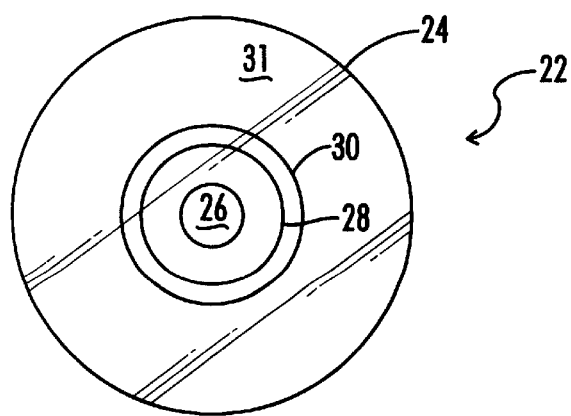
FIG. 5 is a plan view of a second embodiment of the present invention having a contact lens body and three optical filter regions.

Referring to FIG. 5, a second embodiment of a contact lens 22 includes a contact lens body 24, an innermost first optical filter region 26, a second optical filter region 28, and an outermost third optical filter region 30. A clear optical region 31 surrounds the third optical filter region 30 and transmits substantially all of the available visible light, but preferably filtering UV radiation. As mentioned previously in the description of the first embodiment of FIG. 1, the contact lens body 24 is of the type commonly found in the art and may be either a hard or soft contact lens body. The optical filter regions 26, 28, and 30 are obtained by treating the contact lens body 24 with a dye or interference coating to give a desired transmission characteristic. Again, although the regions are shown as having an annular shape, other shapes may be used.

Figure 6:
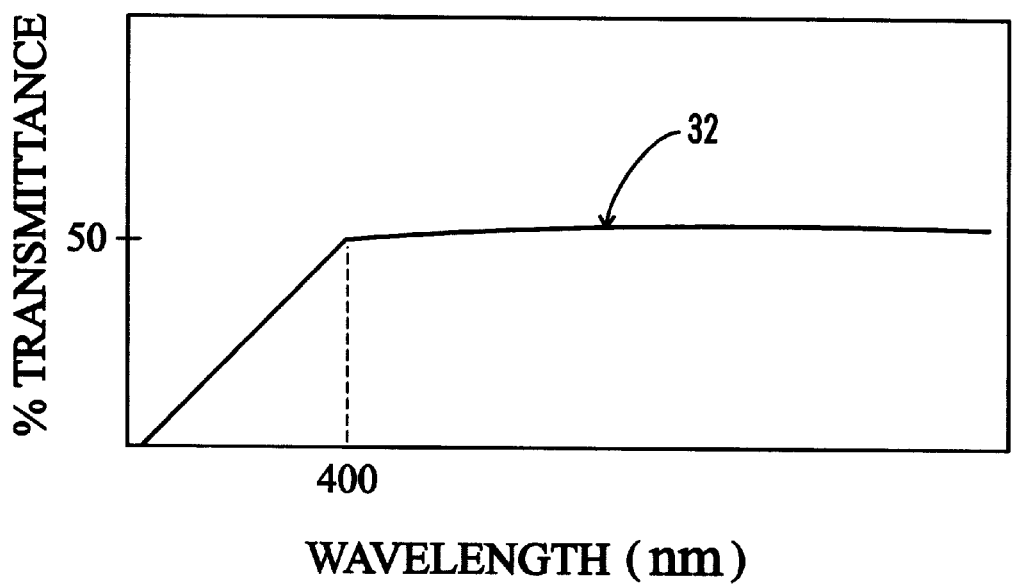
FIG. 6 is graph showing a filter characteristic similar to FIG. 2A but with a greater relative transmission percentage.
Figure 7:
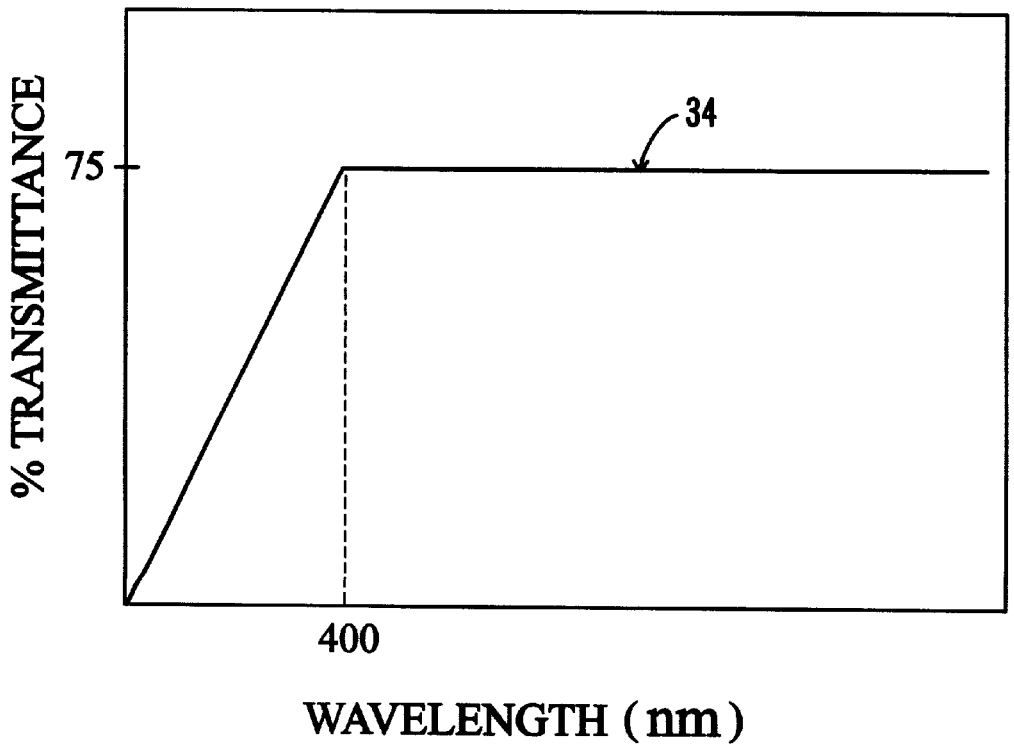
FIG. 7 is graph showing a filter characteristic similar to FIG. 2A and FIG. 6 but with a still greater relative transmission percentage.

Referring to FIG. 2A, FIG. 6, and FIG. 7, preferred variations of the desired transmission characteristics for optical filter regions 26, 28, and 30 are illustrated. Curves 16, 32, and 34 are graphs that illustrate the percent of available incident light as a function of wavelength transmitted by the optical filter regions 26, 28, and 30, respectively.

Curves 16A, 32, and 34 are similar. As previously described, curve 16 illustrates a transmission of approximately twenty-five percent (25% ) of visible wavelengths approximately greater than 400 nm and a roll off to approximately zero percent (0%) for wavelengths approximately less than 400 nm. The only difference between curve 16 and curve 32 is that curve 32 illustrates a transmission of approximately fifty percent (50%) of wavelengths approximately greater than 400 nm rather than approximately twenty-five percent (25% ) as shown by curve 16. Similarly, curve 34 illustrates a transmission of approximately seventy-five percent (75%) of wavelengths approximately greater than 400 nm. Curves 16A, 32, and 34 represent an idealized case of a filter have a flat response above 400 nm while FIG. 2B represents a filter characteristic above 400 nm that is more likely to be obtained in practice. The transmission percentages shown illustrate one possible combination that will provide the automatic adjustment feature of the invention as discussed above but other combinations of transmission percentages that increase as the pupil dilates can be used to provide the same effect.

Figure 8:
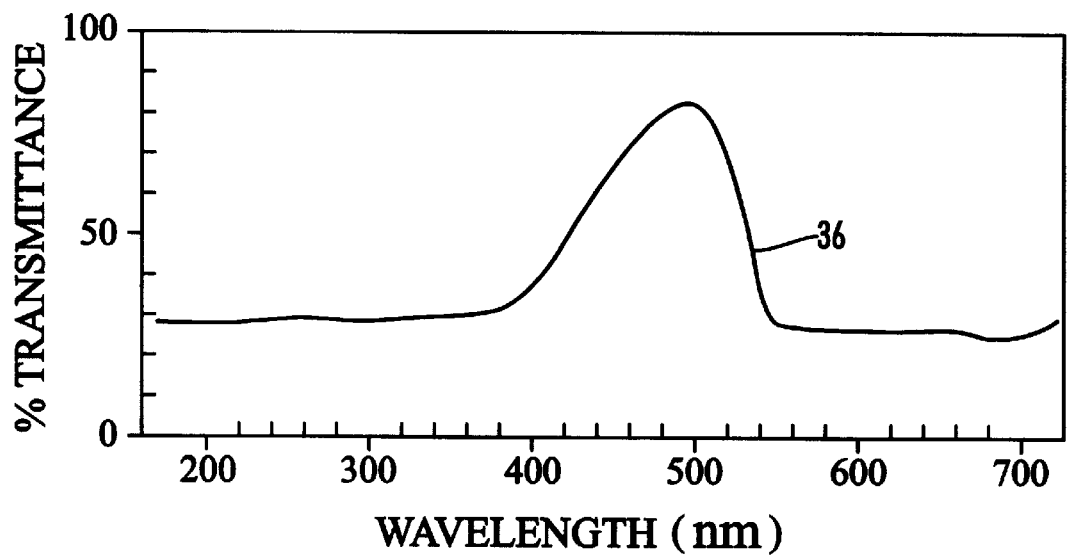
FIG. 8 is graph showing a filter characteristic similar to FIG. 3 but with a greater relative total visible light transmission percentage.
Figure 9:
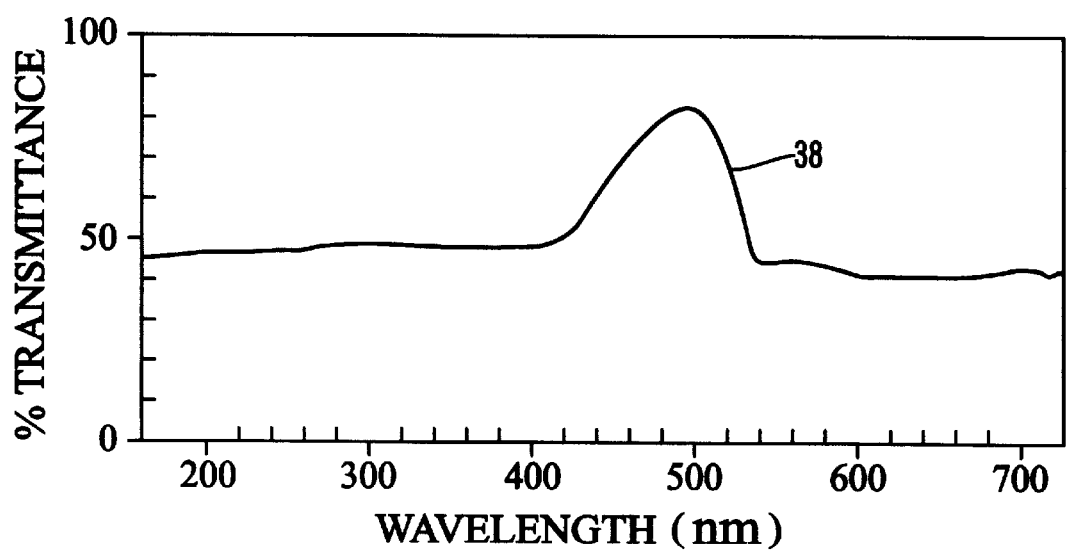
FIG. 9 is graph showing a filter characteristic similar to FIG. 3 and FIG. 8 but with a still greater relative total visible light transmission percentage.

Referring to FIG. 3, FIG. 8, and FIG. 9, additional preferred variations of the desired transmission characteristics for optical filter regions 26, 28, and 30 are illustrated. Curves 36, 38, and 18 are graphs that illustrate the percent of incident visible light as a function of wavelength transmitted by the optical filter regions 26, 28, and 30, respectively.

Curves 18, 36, and 38 are similar except that the transmittance percentage of the total available visible light outside the desired peak region (the peak region being approximately 400 nm–600 nm in this embodiment) increases from approximately zero percent (0%) in optical filter region 26 (FIG. 3), to approximately twenty-five percent (25% ) in filter region 28 (FIG. 8) and then to approximately fifty percent (50%) in filter region 30 (FIG. 9). However, it is preferred that the transmittance of light in the peak region of 400 nm–600 nm remain as high possible while still maintaining the desired sun glass effect. A transmittance percentage in this peak region of approximately 80–90% is attainable. Again, the combination of transmission percentages used in optical filter regions 26, 28, and 30 as shown can be varied without departing from the fundamental concept of the invention.

Referring again to FIG. 4, the desired transmission characteristics for a lens having optical filter regions 26, 28, and 30 as shown in FIG. 5 are illustrated. Preferably, the transmission percentage of the total light available in the range of 450 nm–560 nm increases from the first optical filter region 25 (curve 20), to the second optical filter region 28 (curve 21), and then again to the third optical filter region 30 (curve 23). Preferably, the transmittance of the total visible light in the wavelengths above and below the 450 nm–560 nm range remains at a relatively constant level from the first optical filter region 26 to the third optical filter region 30, as shown on FIG. 4. Again, the transmittance percentages shown are illustrative only and can vary.

Figure 10:
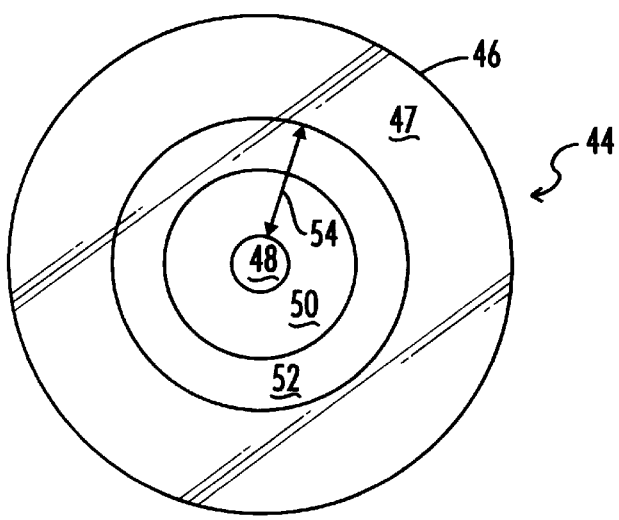
FIG. 10 is a plan view of a third embodiment of the present invention having a contact lens body and three optical filter regions.

Referring to the third embodiment of FIG. 10, a contact lens 44 is comprised of a contact lens body 46 that includes a first optical filter region 48, a variable optical filter region 50, and a third optical filter region 52. The variable optical filter region 50 has a radial dimension 54. An optically clear region 47 (preferably with UV filtering) surrounds third optical filter region 52. As described previously with reference to the embodiments of FIG. 1 and FIG. 5, the contact lens body 44 is of the type commonly found in the art and may be either a hard or soft contact lens body. The optical filter regions may be annular, oval or other shapes. First optical filter region 48 is obtained by treating the contact lens body 46 with a dye or interference coating to give a desired transmission characteristic. Variable optical filter region 50 is obtained by treating the contact lens body 46 with a gradually decreasing amount of dye or an interference coating that provides a transmittance gradient in which the transmittance increases as the radial distance from the center of the lens increases. The amount of the dye or attenuation due to the interference coating decreases from a maximum amount applied at a point closest to a center of the contact lens body 46 to a minimum amount at a point farthest from the center of the contact lens body 46.

Figure 11:
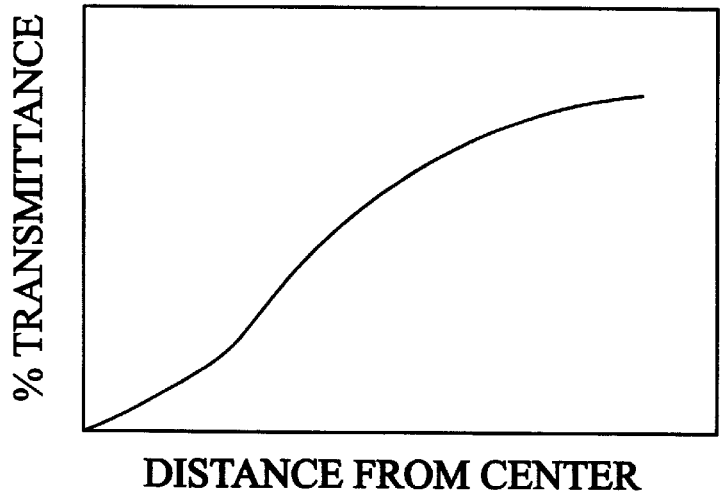
FIG. 11 is a graph showing an increasing relative transmission percentage moving from a point closest to a center of the contact lens body to a point farthest from the center of the contact lens body.

Referring to FIG. 11, curve 56 is a graph that illustrates the relative gradient filter/transmission characteristic for variable optical filter region 50. As shown, optical filter region 50 transmits a gradually increasing percentage of the total available visible light as the radius 54 increases from a point closest to the center of the contact lens body 46 to a point farthest from the center of the contact lens body 46.

Each of the three optical filter regions may again have one of three different filter characteristics. In one preferred variation, optical filter region is 48 is identical to the optical filter region 14 described previously. Thus, FIGS. 2A and 2B illustrate the filter characteristic for optical filter region 48. Optical filter region 50 transmits an increasing percentage of the total visible light having wavelengths approximately greater than 400 nm. Optical filter region 52 transmits a higher (up to 100%) percentage of the total visible having wavelengths approximately greater than 400 nm.

In a second preferred variation, optical filter regions 48, has the transmission characteristic shown in FIG. 3 as described above. Variable optical filter region 50 will provide a filter characteristic in which the transmission of visible light increases radially outward in the region 50, as shown by curves IS (FIG. 3), 36 (FIG. 8) and 38 (FIG. 9).

Figure 4:
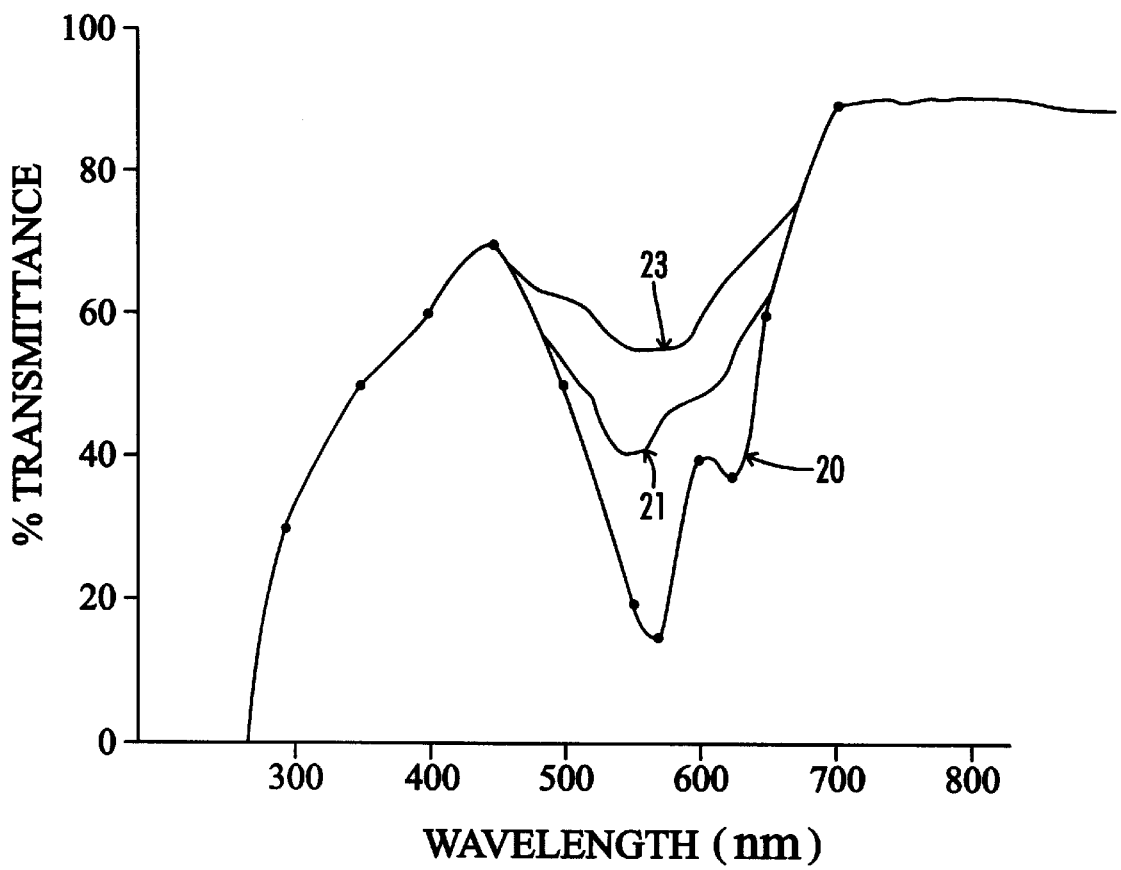
FIG. 4 is a graph characterizing a lavender color filter and showing a variable transmission percentage of light having wavelengths ranging from approximately 300 nm to approximately 680 nm with a relatively high transmittance in the blue region, a reduced transmittance in the range of 550–575 nm, and a relatively high transmission percentage of light having wavelengths approximately greater than 680 nm. Further.

In a third preferred variation, optical filter region 48 ha s the transmission characteristic shown in FIG. 4 as described above. Optical filter region 50 transmits an increasing variable percentage of total light having wavelengths ranging from approximately 300 nm to approximately 680 nm, and transmits an increasing percentage of visible light having wavelengths approximately greater than 680 nm. A relatively substantial percentage of blue light and red light is transmitted, with a reduced transmittance of light in the range of approximately 550–575 nm. Optical filter region 52 transmits a higher percentage (up to 100%) of wavelengths approximately greater than 300 nm.

Figure 12:
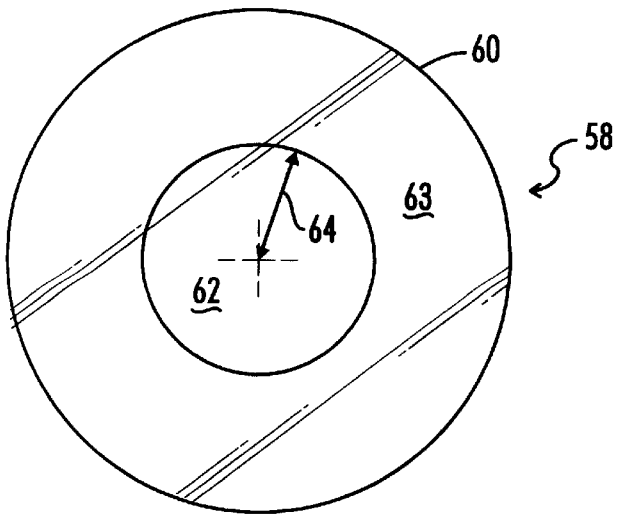
FIG. 12 is a plan view of a fourth embodiment of the present invention having a contact lens body and a single optical filter region with variable attenuation.

Referring to FIG. 12, a fourth embodiment of the invention is shown in which contact lens 58 includes a contact lens body 60 with a clear optical region 63 surrounding a variable optical filter region 62. The variable optical filter region 62 ha s a radius 64. As mention ed above in the descriptions of FIG. 1, FIG. 5, and FIG. 10, the contact lens body 60 is of the type commonly found in the art and may be either a hard or soft contact lens body. Variable optical filter region 62 is obtained by treating the contact lens body 60 with a gradually decreasing amount of dye or with an interference coating. The amount of dye or amount of attenuation provided by the interference coating decreases from a maximum amount at a point closest to a center of the contact lens body 60 to a minimum amount at a point farthest from the center of the contact lens body 60.

The filter characteristics of variable optical filter region 62 are similar to the variable filter characteristics of variable optical filter region 50 shown in FIG. 11.

In yet another embodiment of the invention, the filter characteristics of the different optical filter regions as shown in FIGS. 1, 5 10, or 12 may be varied between regions, or at greater radial distance from the center of the lens (in addition to the relative transmission percentage), such that the region of maximum transmittance is directed to different wavelengths in two or more optical filter regions or is gradually changed within a single optical region. For example, looking at FIG. 5, the second and third optical filter regions 28 and 30 would be optimized to for viewing a white golf ball against a green background (such as a putting green). Accordingly, when the wearer of the lens looks downward toward the green, the decrease in light intensity would cause the pupil to dilate such that a greater percentage of the light passes through the portion of the lens that is optimized for that background. The first optical filter region 26 would optimized for a blue sky background. Thus, when the wearer looked up toward the sky (such as when following a golf ball traveling through the air, the pupil would constrict in response to the increase in light intensity, and a greater percentage of the light reaching the retina would be passing through the central portion of the lens. Similarly, looking at FIG. 1, a single optical filter region 14 could be provided in which the color tint changes gradually from blue to green, for example, as the filter region 14 extends outwardly from the center of the lens. In this embodiment, the incident light perceived by the wearer of the lens would change colors (either in steps or gradually) as the wearer moves from high to low intensity ambient light levels. Note, however, that the term "tint" in the context of this invention is not limited to any particular defined colors and can include, for example, a gray "tint" that would be associated with a neutral density filter.

Thus, although there have been described particular embodiments of the present invention of a new and useful Contact Lens with Light Filtering for Outdoor Sporting and Recreational Activities, it is not intended that such references be construed as limitations upon the scope of this invention except as set forth in the following claims.

What is claimed is:

1. A contact lens for filtering light transmitted through the pupil to the retina in an eye of a wearer of the lens during outdoor sporting and recreational activities comprising:

a. a contact lens body with at least a portion of the contact lens body comprising a first optical filter region;

b. the first optical filter region characterized by a first filter range of radiation wavelengths wherein a transmission percentage of light through the first optical filter region is substantially less than 100% but substantially greater than 0%;

c. wherein the first filter range includes radiation having wavelengths within the range of approximately 400–500 nm; and d. wherein the first optical filter region is provided at a center portion of the contact lens body and the contact lens includes a clear optical region surrounding the first optical filter region, whereby as the pupil of the eye dilates, a larger percentage of the light transmitted to the retina passes through the clear optical region.

2. The contact lens of claim 1 wherein the transmission percentage in the first filter range gradually increases from an inner portion of the first optical filter region to an outer portion of the first optical filter region whereby the intensity of light perceived by the wearer of the lens increases as the pupil in the eye of the wearer dilates.

3. The contact lens of claim 1 wherein the transmission percentage in the first filter range increases in steps from an inner portion of the first optical filter region to an outer portion of the first optical filter region whereby the intensity of light perceived by the wearer of the lens increases in steps as the pupil in the eye of the wearer dilates.

4. The contact lens of claim 1, wherein the first optical filter region comprises an annular region concentric with the center portion of the contact lens body, the annular region having a diameter ranging from 0.8 millimeter to 8 millimeters.

5. A contact lens for filtering light transmitted through the pupil to the retina in an eye of a wearer of the lens during outdoor sporting and recreational activities comprising:

a. a contact lens body with at least a portion of the contact lens body comprising a first optical filter region;

b. the first optical filter region characterized by a first filter range of radiation wavelengths wherein a transmission percentage of light through the first optical filter region is substantially less than 100% but substantially greater than 0%;

c. wherein the first filter range includes radiation having wavelengths within the range of approximately 400–500 nm; and d. wherein the first optical filter region is further characterized by a second filter range wherein radiation having wavelengths less than 300 nm is substantially attenuated as compared to radiation in the first filter range, and by a third filter range wherein the percentage of total radiation transmitted having wavelengths of approximately 550–575 nm is substantially less than the transmission percentage of total visible radiation having wavelengths above 680 nm and in the range of 400–450 nm.

6. A contact lens for outdoor sporting and recreational activities, comprising:

a lens body for transmitting a high percentage of light through the pupil of an eye of a user over a spectrum of wavelengths within a visible light spectrum, to define at least one filter spectrum;

an optical filter region integral to a central portion of the lens body for attenuating light at wavelengths outside the filter spectrum such that the filter spectrum is broader than a target spectrum and narrower than the visible spectrum, and whereby the filter spectrum has upper and lower edges defined by wavelengths where light in the visible spectrum outside the upper and lower edges is substantially attenuated as compared to a center portion of the filter spectrum, the optical filter region having a color tint visible to the user;

the target spectrum comprising a spectrum of wavelengths of light which emanate from a target to define a true color of the target, the target spectrum corresponding to a relatively narrow portion of the visible light spectrum of wavelengths, and wherein the target spectrum is further defined by at least one target wavelength which corresponds to a point within the first target spectrum of peak light intensity, with light intensity within the target spectrum both above and below the first target wavelength being of decreasing intensity compared to the first target wavelength;

the optical filter region further attenuating light such that the target wavelength is within the filter spectrum and proximate either the upper or lower edge of the filter spectrum whereby the target object is perceived by the user as having its substantially true color and background objects are perceived as having a contrasting color which is substantially the same as the color tint of the optical filter means; and the lens body further comprising a clear optical region surrounding the optical filter region, the clear optical region having an inner diameter corresponding to the diameter of a constricted pupil such that a greater percentage of the light transmitted through the pupil passes through the clear optical region as the pupil dilates in response to a decrease in ambient light intensity.

7. The contact lens of claim 6 wherein there are first and second filter spectra and first and second target spectra corresponding to first and second target objects having different target wavelengths.

8. A contact lens for outdoor sporting and recreational activities, comprising:

a contact lens body, at least a portion thereof comprising: first, second, and third adjacent optical filter regions extending radially outward from a central portion of the lens body, each optical filter region operative to transmit substantially more than 0% but substantially less than 100% of the total light within a first filter range of wavelengths, the first filter range including wavelengths of approximately 400–500 nm; and whereby a percentage of the total visible light transmitted by the optical filter regions in the first filter range increases in steps from the first to the second, and then from the second to the third, optical filter regions, such that a wearer of the lens will perceive a reduction in light attenuation by the lens as the pupil of the wearer's eye dilates in response to a decrease in intensity of ambient light.

9. The contact lens of claim 8 wherein each of the first, second, and third optical filter regions substantially attenuate light having wavelengths less than 400 nm, as compared to transmission of visible light having wavelengths within the first filter range.

10. The contact lens of claim 9 wherein the transmission percentage in the first filter range varies at different wavelengths above 400 nm.

11. The contact lens of claim 10 wherein the first, second, and third optical filter regions are each further characterized by a second filter range wherein visible light having a wavelength approximately greater than 600 nm is substantially attenuated as compared to light in the first filter range.

12. The contact lens of claim 8 wherein the first, second, and third optical filter regions are each further characterized by a second filter range wherein light having wavelengths less than 300 nm is substantially attenuated as compared to radiation in the first filter range, and by a third filter range wherein the transmission percentage of the total light having wavelengths of approximately 550–575 nm is substantially less than the transmission percentage of the total visible light having wavelengths above 680 nm and of light having wavelengths in the range of 400–450 nm.

13. The contact lens of claim 8 wherein the first and second filter regions are each further characterized by a second filter range wherein light having wavelengths approximately greater than 600 nm is substantially attenuated as compared to light in the first filter range and wherein the third optical filter region is characterized by transmitting substantially all of the visible light having any wavelength.

14. A contact lens for outdoor sporting and recreational activities, comprising:

a contact lens body, at least a portion thereof comprising a first optical filter region for substantially attenuating radiation having wavelengths approximately less than 400 nm and transmitting approximately 25% of visible radiation having wavelengths approximately greater than 400 nm;

a second optical filter region adjacent to and surrounding the first optical filter region and operative to substantially attenuate radiation having wavelengths approximately less than 400 nm and to transmit approximately 50% of visible radiation having wavelengths approximately greater than 400 nm; and a third optical filter region adjacent to and surrounding the second optical filter region and operative to substantially attenuate radiation having wavelengths approximately less than 400 nm and to transmit approximately 75% of visible radiation having wavelengths approximately greater than 400 nm.

15. A contact lens comprising:

a. a plurality of optical filter regions integral to a contact lens body and arranged concentrically outward from a central portion of the lens body;

b. at least a first one of the optical filter regions substantially attenuating light outside a first range of wavelengths and transmitting substantially greater than 0% but substantially less than 100% of the total light within the first range of wavelengths;

c. at least a second one of the optical filter regions substantially attenuating light outside a second range of wavelengths and transmitting substantially greater than 0% but substantially less than 100% of the total light within the second range of wavelengths; and d. wherein the first and second ranges of wavelengths do not completely overlap such that the color tint of light perceived by a wearer of the lens will change as the pupil of the eye of the wearer dilates.

16. The contact lens of claim 15 wherein at least one of the first and second ranges of wavelengths is selected to correspond to a spectrum of light reflected from a target object.

17. The contact lens of claim 15 wherein the percentage of total light transmitted by an inner one of the optical filter regions is less than the percentage of total light transmitted by an outer one of the optical filter regions.

18. A contact lens having an optical filter area extending outwardly from a center portion of a contact lens body, the optical filter area having a characteristic filter spectrum that changes from an inner portion of the filter area to an outer portion of the filter area such that light perceived by a wearer of the lens will have a changing tint as the wearer's pupil changes in response to ambient light levels.

19. The contact lens of claim 18 in which the optical filter area comprises a single optical filter region providing a transmission gradient whereby the percentage of total light transmitted through the filter area increases from the inner portion of the filter area to an outer portion of the filter area.

20. The contact lens of claim 18 in which the optical filter area comprises a plurality of concentric filter regions having different filter spectra whereby the filter spectrum of the filter area changes in steps.

21. A contact lens having a filter area integral to a contact lens body and providing a stepped increase in light transmission percentage extending outwardly from a central portion of the contact lens body to an outer portion of the contact lens body, whereby the intensity of light perceived by a wearer of the lens will vary as the pupil of the wearer changes in diameter in response to changes in ambient light levels and wherein the filter area comprises a plurality of discrete concentric optical filter regions.

22. A contact lens comprising:
   a. a contact lens body;
   b. a first filter region formed in a central portion of the contact lens body, the first filter region and having a light filtering color tint that is substantially constant from an inner portion of the region to an outer margin of the region;
   c. a second filter region having an inner margin adjacent to the outer margin of the first filter region, the second filter region being provided with a light filtering color tint that gradually lightens from the inner margin of the second filter region to an outer margin of the second filter region to allow higher percentages of light transmission at greater distances from the center of the lens.

23. The contact lens of claim 22 wherein the color tint within the second filter region gradually changes at greater radial distances from a center portion of the lens.

* * * * *